W. J. JONES.
VEHICLE WHEEL.
APPLICATION FILED JULY 12, 1916.

1,225,967.

Patented May 15, 1917.
2 SHEETS—SHEET 1.

Witnesses
James F. Crown,
L. N. Gilley

Inventor
W. J. Jones,
By
Attorneys

W. J. JONES.
VEHICLE WHEEL.
APPLICATION FILED JULY 12, 1916.
1,225,967.
Patented May 15, 1917.
2 SHEETS—SHEET 2.
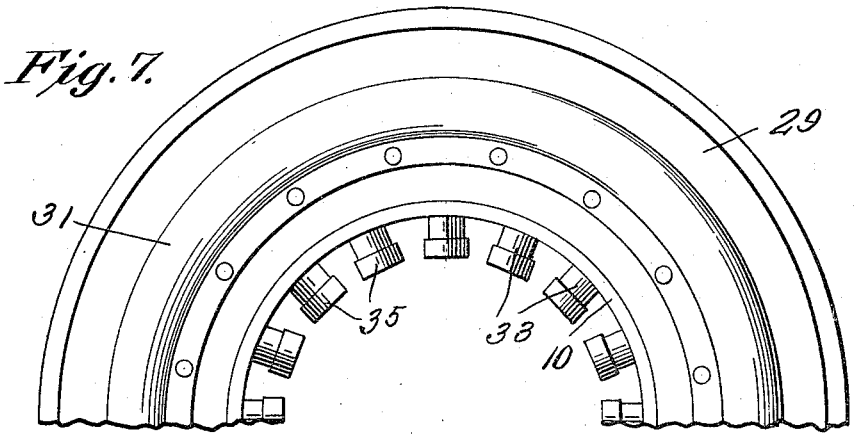
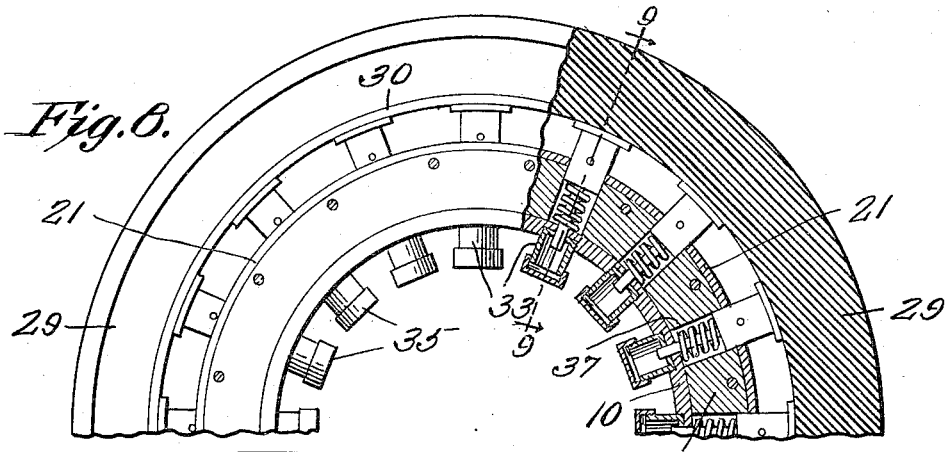
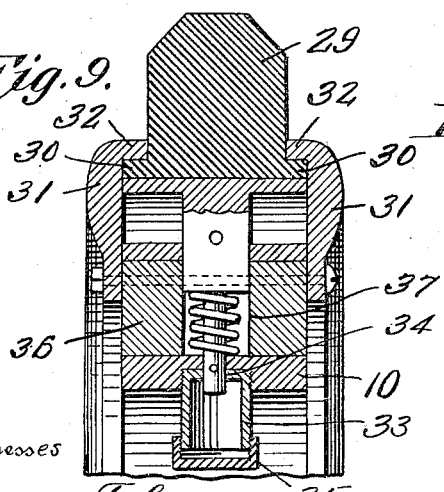
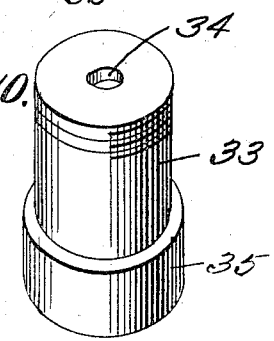
Witnesses
James F. Crown
L. N. Gillis
Inventor
W. J. Jones,
By
Attorneys

UNITED STATES PATENT OFFICE.

WILLIAM J. JONES, OF MARTINSVILLE, VIRGINIA.

VEHICLE-WHEEL.

1,225,967.  Specification of Letters Patent.  Patented May 15, 1917.

Application filed July 12, 1916. Serial No. 108,864.

*To all whom it may concern:*

Be it known that I, WILLIAM J. JONES, a citizen of the United States, residing at Martinsville, in the county of Henry, State of Virginia, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels and has special reference to a resilient rim for wheels of this description.

One important object of the invention is to improve and simplify the general construction of devices of this character.

A second important object of this invention is to provide a wheel having a resilient rim supported on floating plugs which are arranged to effectually act as lubricant carrying or conveying devices in addition to their function of supporting the tire.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Fig. 7 is a partial side elevation of a modified form of the invention.

Fig. 8 is a view similar to Fig. 7, certain cover plates being removed and the view being partially in section.

Fig. 9 is a section on the line 9—9 of Fig. 8.

Fig. 10 is a detail perspective of an oil cup used herewith.

Figure 1:
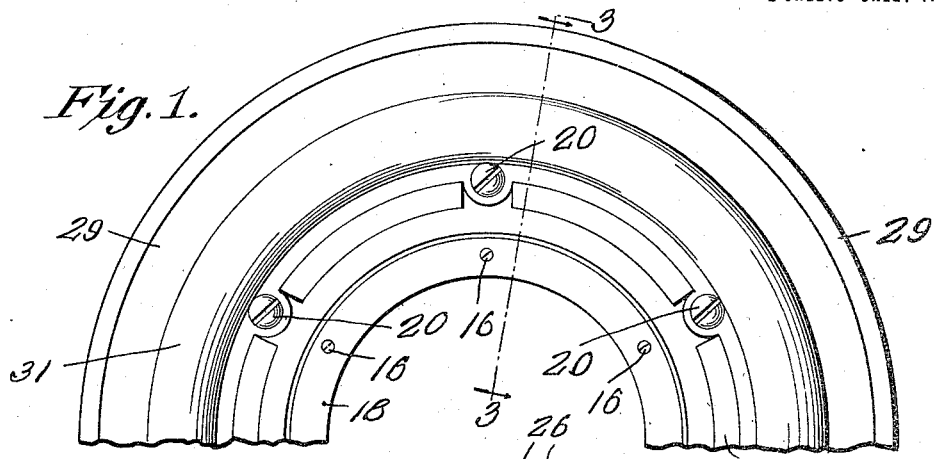
Figure 1 is a side elevation of one-half of a wheel constructed in accordance with this invention.
Figure 2:
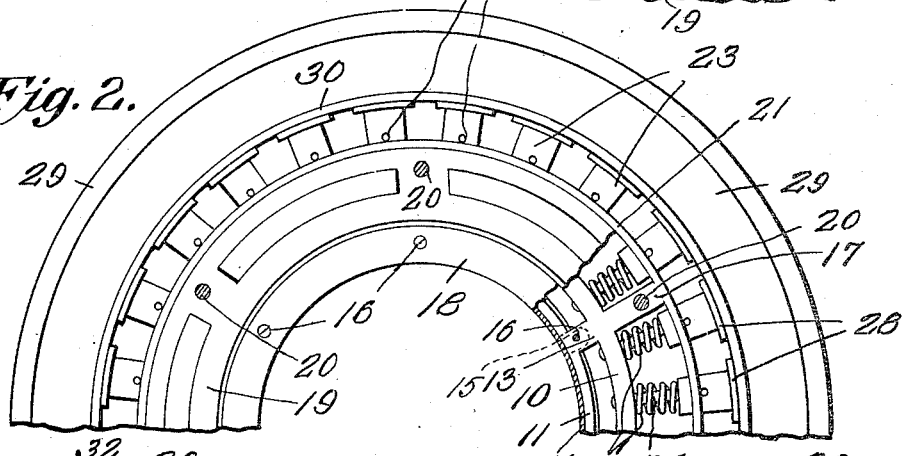
Fig. 2 is a detail side elevation of a portion of a wheel with the side cover plates removed.
Figure 3:
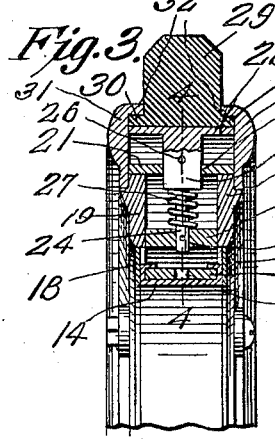
Fig. 3 is a section on the line 3—3 of Fig. 1.
Figure 4:
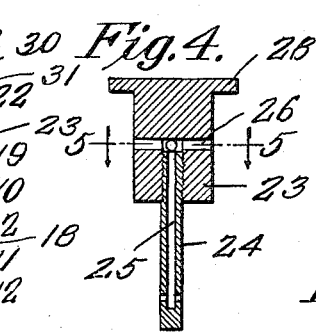
Fig. 4 is a section through one of the plugs on the line 4—4 of Fig. 3.
Figure 5:
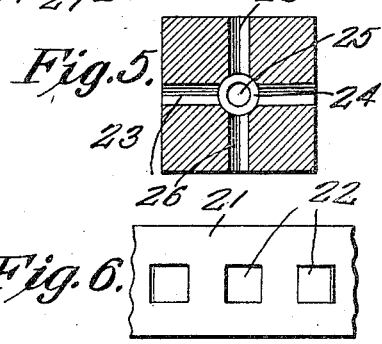
Fig. 5 is a section on the line 5—5 of Fig. 4.
Figure 6:
Fig. 6 is a detail view of a portion of the outer rim member.

In the embodiment of the invention herein illustrated a resilient rim for vehicle wheels wherein there is employed an inner member is provided, having spaced annular inner and outer walls 10 and 11. These inner and outer walls are provided with radially alined openings 12 for purposes hereinafter to be described. Connecting the inner and outer walls 10 and 11 are integral lugs 13 which hold these inner and outer walls in spaced relation so that oil pockets are formed between such walls. In order to close the inner ends of the openings 12 in the inner wall there is provided an annular cover plate 14 which extends around the inner face of the inner wall and is provided with lugs 15 secured to the lugs 13 by means of screws 16. Projecting outwardly from the outer wall are radial lugs 17 and side cover plates 18 cover the space between the inner and outer walls and are secured to the lugs 13 by the screws 16, other side cover plates 19 extending outwardly from the outer wall, and being secured to the radial lugs 17 by means of bolts 20.

Resting on the radial lugs 17 and secured thereto is an outer annular member 21 which is provided with a peripheral series of polygonal openings 22. Slidable radially in the openings 22 are plugs 23 which are provided with hollow stems 24 slidable through the openings in the outer wall of the inner member and having their inner ends also slidable into the openings 12 of the inner wall. The hollow portions 25 of these stems connect with ports 26 opening through the several sides of the plugs 23. By this means lubricant, held in the lubricant chambers, is led up from these chambers and outward on the sides of the plugs so that these plugs are thoroughly lubricated in their passage through the outer member 21.

In order to hold the plugs normally pressed outward there is provided a series of springs 27 which are mounted on the stems and bear at one end against the respective plug while at the other end they bear against the outer surface of the outer wall 10.

These plugs are provided with rectangular heads 28 on which rest a solid tire 29 provided with locking flanges or beads 30. Carried by the cover plates 19 are plates 31 which are provided with flanges 32 interlocking with the flanges 30 to hold the tire in position.

In operation, when weight is brought upon the tire the plugs, at the portion of the tire contacting with the ground are forced inward against the action of the springs 27 and as the tire moves around these plugs again move outward other plugs being forced inward in their places. This continued movement in and out of the plugs serves to pump the oil through the hollow stems and ports so that the plugs are thoroughly lubricated.

In the modified form illustrated in Figs. 7 to 10 the same general arrangement is used but the inner annular wall 11 is dispensed with as are also the lugs 17. The places of the oil pockets formed by the annular wall are taken by oil cups consisting of bodies 33 screwed into suitable recesses in the wall 10 and provided with openings 34 wherein work the stems 24. These cups are of course provided with screw caps 35. In place of the lugs 17 the space between the members 10 and 21 is filled with the wood filler 36 having suitable openings 37 therein for the location of the springs 27 as clearly shown in Fig. 8.

Otherwise, the device is the same as that previously described and operates in the same manner.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

A vehicle wheel comprising an inner rim member, the member being provided with spaced radial openings, an outer member concentric to the inner member and provided with polygonal openings of substantially larger area than the openings in said inner member, plungers each having a polygonal body slidable through a respective outer member opening and a reduced stem slidable through a respective opening in the inner member, each of said plungers having a rectangular head, springs surrounding said stems and urging said plungers outward, a tire resting on said heads and laterally coterminous therewith, said tire having lateral flanges, and rigid side plates having internal flanges overlapping the flanges of the tire and lateral portions of the plunger heads.

In testimony whereof, I affix my signature, in the presence of two witnesses.

WILLIAM J. JONES.

Witnesses:
T. H. SELF,
J. B. DAVIS.

Copies of this patent may be obtained for five cents each, by addressing the "Commissioner of Patents, Washington, D. C."